2,795,603

PROCESS FOR RECOVERING BETAINE HYDROCHLORIDE

Jacob W. Sietsema, Northbrook, Ill., assignor to International Minerals & Chemical Corporation, a corporation of New York No Drawing. Application November 26, 1954, Serial No. 471,489

5 Claims. (Cl. 260—501)

This invention relates to the production of betaine hydrochloride, and more particularly, to the production of inorganic potassium salts, betaine hydrochloride, and glutamic acid from Steffen's filtrate.

Steffen's filtrate, which is a dilute solution of waste products resulting from the desugarization of sugar beet solutions, contains various chemical components including inorganic salts of potassium and sodium, small quantities of sugar, various amounts of glutamic acid mother substances, and free glutamic acid of glutamic acid salts, along with betaine. Numerous procedures have been proposed for recovering the inorganic salts, betaine and glutamic acid, from Steffen's filtrate. According to one method, Steffen's filtrate is concentrated to a specific gravity between about 1.2 and about 1.4 at room temperature, and a concentrated mineral acid, such as hydrochloric acid or sulfuric acid, is added in order to precipitate inorganic salts and betaine salts together. The filtrate which results from removal of these salts by filtration is then hydrolyzed, usually under acidic conditions, in order to liberate glutamic acid from the glutamic acid mother substances. By adjusting the pH of the hydrolyzate to approximately 3.2, glutamic acid is crystallized from the solution, usually in an impure form.

According to another procedure for recovering betaine from Steffen's filtrate, the pH of the Steffen's filtrate is adjusted to about 2.5 with sulfuric acid whereupon sulfate salts of sodium and potassium precipitate and are removed by filtration. The filtrate is then treated with hydrochloric acid to precipitate betaine as betaine hydrochloride. Betaine hydrochloride is recovered by filtration and consequently is contaminated with all of the inorganic salts which precipitate along with the betaine hydrochloride. Betaine hydrochloride recovered from the filter cake without special processing has a maximum purity of the order to 90% to 95%.

The various procedures heretofore employed for the recovery of betaine hydrochloride, whether they involve the coprecipitation of inorganic salts along with the betaine hydrochloride, or the precipitation of inorganic salts prior to the precipitation of betaine hydrochloride, have always been beset with the difficulty that the betaine thus obtained was highly contaminated with inorganic salts and had to be further purified by re-crystallization or other means before it was suitable for its end use. There has ben a need for a process for recovering betaine hydrochloride from its solutions, for example, from Steffen's filtrate or Steffen's filtrate end liquor remaining after the removal of glutamic acid from Steffen's filtrate, or from materials such as vinasse, by a process which would produce betaine hydrochloride in a substantially completely pure state suitable for use without further purification.

It is an object of this invention to produce betaine hydrochloride in a high state of purity from solutions containing betaine hydrochloride.

A further object of the invention is to produce substantially completely pure betaine hydrochloride from solutions containing betaine hydrochloride and inorganic salts.

Another object of this invention is to provide a process for producing substantially completely pure betaine hydrochloride from a solution containing betaine hydrochloride and inorganic salts while simultaneously removing the inorganic salts from the solution.

A further object of the invention is to provide a commercially feasible process for separating substantially completely pure betaine hydrochloride and inorganic salts simultaneously from concentrated Steffen's filtrate, vinasse or concentrated Steffen's filtrate end liquor remaining after the removal of glutamic acid from Steffen's filtrate.

In accordance with this invention, a solution containing betaine hydrochloride and having a pH of less than about 1.0 is treated to crystallize the betaine hydrochloride. The mixture containing the liquor and crystallized solids is then centrifuged whereupon the betaine hydrochloride crystals present form a cake on the surface of the liquor and may be removed.

More particularly, the instant process involves adding sufficient hydrochloric acid to a solution of betaine, for example, concentrated Steffen's filtrate, vinasse or concentrated Steffen's filtrate end liquor remaining after the removal of glutamic acid from concentrated Steffen's filtrate, to adjust the pH of the solution to less than about 1.0 and, preferably to less than about 0.5, and to provide the solution with chloride ions in an amount at least as great as the chemical equivalent weight of betaine in solution. The adjusted solution is then concentrated to a specific gravity between about 1.2 and about 1.5, and preferably, to a specific gravity between about 1.35 and about 1.5. The concentrated solution is then allowed to stand with gentle stirring in order to permit crystallization of any crystallizable material contained therein. The process of this invention may be carried out at any convenient temperature, but room temperatures are eminently satisfactory, although lower temperatures may be utilized to accelerate crystallization of the solids from solution or increase the yield thereof. The crystallization procedure may require several hours in order to reach equilibrium conditions, but usually a few hours will be sufficient. Following completion of the crystallization of solids from the solution, the mixture is centrifuged to bring about a gravimetric separation of the solids and liquid contained therein. Three phases are thereby produced—two solid phases separated by a liquid phase. Centrifuging results in the settling of any inorganic salts while any betaine hydrochloride which has crystallized will rise to the top of the liquor. Betaine hydrochloride may then be scraped from the surface of the liquor or separated by any other convenient means. The betaine hydrochloride produced by this process is substantially completely pure betaine hydrochloride, by which is meant betaine hydrochloride having a purity of greater than about 96%. Usually betaine hydrochloride produced in accordance with the instant invention will have a purity of the order of 98% or higher.

The centrifugation step may be carried out in any conventional centrifuge which operates on the principle of gravimetric separation, that is, separation of material by reason of their different densities. Such a centrifuge is distinguished from a basket-type centrifuge which is merely a means for obtaining forced filtration. The centrifuge need not be extraordinary in design or performance. Any standard centrifuge operating at a speed of, for example, in excess of about 100 R. P. M. may be utilized. Very good results are obtained using standard laboratory centrifuges operating at speeds of from about 1000 to about 2000 R. P. M. The best and quickest separations are obtained with any given vessel when the greatest centrifugal force is utilized in effecting the separation.

Following separation of the betaine hydrochloride from liquor and inorganic salts in the centrifuge vessel, the inorganic salt precipitate may be recovered by any suitable means. A convenient procedure involves filtration of the remaining contents of the centrifuge vessel or simply decantation of the liquid phase. The inorganic salts thus removed will comprise a substantial quantity of potassium salts from which the potash values may be recovered by conventional procedures.

The liquid phase recovered from the centrifuge vessel in the separation of betaine hydrochloride and inorganic salts from Steffen's filtrate, or vinasse, in accordance with the above outlined procedure may be processed for the recovery of glutamic acid and other amino acids. Thus, the liquid phase may be subjected to hydrolysis, preferably under acidic conditions, with a non-oxidizing mineral acid, such as hydrochloric acid, in order to hydrolyze the glutamic acid mother substances. The pH of the hydrolyzate is then adjusted to about 1.6 with an inorganic alkaline compound after which insoluble material and any salts which crystallize from the solution are separated therefrom. The adjusted hydrolyzate is concentrated at least to a point where incipient crystallization of salts may occur and said salts are crystallized and removed from the concentrate, preferably at a temperature between about 40° C. and about 60° C. The pH of the resultant solution is adjusted with an alkaline compound to about 3.2 and glutamic acid is crystallized and recovered therefrom.

It will be understood that in the step of the process which involves treatment of Steffen's filtrate, Steffen's filtrate end liquor or vinasse, to produce betaine hydrochloride, that either aqueous or anhydrous HCl may be employed.

In a preferred embodiment of this invention, Steffen's filtrate, preferably concentrated to a specific gravity between about 1.2 and about 1.5, is treated with hydrochloric acid to give a pH of less than about 1.0, and preferably, less than about 0.5. The adjusted concentrated Steffen's filtrate is then again concentrated to a specific gravity between about 1.2 and about 1.5, and preferably to a specific gravity between about 1.35 and about 1.5, if necessary, that is, if the specific gravity of the adjusted solution is lower than these values.

The adjusted concentrated Steffen's filtrate is then placed in a centrifuge, preferably a centrifuge of a standard type having a rotation speed in excess of about 1000 R. P. M. and centrifuged until three distinct phases are produced. The uppermost phase will comprise solid betaine hydrochloride and may be scraped off with a knife blade. The remaining material in the centrifuge vessel is then filtered to produce a filter cake comprising inorganic salts. The filtrate containing glutamic acid mother substances may be hydrolyzed to produce glutamic acid. Concentrated hydrochloric acid (37% HCl) is preferably employed in the hydrolysis step which is carried out at a temperature between about 100° C. and about 125° C. for a period between about ¼ hour and about 4 hours. The pH of the hydrolyzate is adjusted to about 1.6 by means of a suitable inorganic alkaline compound, for example sodium hydroxide, potassium hydroxide, ammonium hydroxide, etc. The adjusted hydrolyzate may either be filtered in order to remove insoluble organic matter and salts which may crystallize at this step in the process, or it may be concentrated directly to a point at which crystallization of salts occurs. Usually concentration to between about 55% and about 90% of the weight of the original Steffen's filtrate will suffice. The concentrated hydrolyzate is cooled to a temperature between about 40° C. and about 60° C. and inorganic salts are crystallized and separated therefrom. The pH of the resultant solution is then adjusted to about 3.2 by means of a suitable inorganic alkaline reagent such as those previously described. Preferably, this pH adjustment is accomplished with anhydrous ammonia, for the reason that the solution is not thereby further diluted with water. Also, the ammonium salts are, in general, more soluble in the glutamic acid liquor than are the corresponding sodium or potassium salts, and the subsequently crystallized glutamic acid will be less contaminated with inorganic salts. The solution of glutamic acid at a pH of about 3.2 is allowed to stand for several days in order to permit crystallization of glutamic acid. The product is separated from the solution by filtration or other suitable means. The product may either be dried directly or may be repulped with about 60% by weight of water in order to remove residual inorganic salts. The purity of the repulped glutamic acid is between about 90% and about 95% and may be converted directly into monosodium glutamate by neutralization with one equivalent of an alkaline reagent such as sodium hydroxide, sodium carbonate or sodium bicarbonate. Monosodium glutamate is valuable in the food industry as a flavoring material.

The Steffen's filtrate hydrolyzate which is prepared, as described above, subsequent to the removal of inorganic salts and betaine hydrochloride may be processed according to several modifications of the above described novel process. For example, insoluble organic material and salts may be separated directly from the hydrolyzate after which the pH of said hydrolyzate is adjusted to about 1.6 as previously described. The adjusted hydrolyzate is then concentrated at least to the point of incipient crystallization of salts. The hydrolyzate may also be adjusted directly to a pH of about 1.6 and then concentrated at least to the point of incipient crystallization of salts, and said salts removed together with insoluble organic material. The purity of the glutamic acid produced according to either procedure is equally high.

Although hydrolysis of the Steffen's filtrate, from which inorganic sulfate salts and betaine hydrochloride have previously been removed, is usually accomplished by means of acid reagents, such as hydrochloric acid, sulfuric acid, phosphoric acid, etc., the hydrolysis may also be conducted by means of various alkaline reagents, for example sodium hydroxide and/or calcium oxide or hydroxide. If an alkaline hydrolysis is desired, about 10.0% of the reagent, based on the weight of the Steffen's filtrate, is used, and the temperature during the hydrolysis is maintained below 100° C., and preferably at about 85° C. Usually about two hours will suffice to convert the glutamic mother substances into glutamic acid. The pH of the alkaline hydrolyzate is adjusted to about 1.6 with a suitable acidic reagent, for example concentrated hydrochloric acid, sulfuric acid or phosphoric acids. The subsequent removal of inorganic salts, pH adjustment to about 3.2 and recovery of glutamic acid are substantially the same as described when employing mineral acid hydrolyzing reagents.

In a further embodiment of the invention, an acid hydrolyzate, from which inorganic sulfate salts and betaine hydrochloride have previously been removed, as above described, is treated with an alkaline Steffen's filtrate hydrolyzate prepared as described above, while avoiding conditions conducive to the precipitation of substantial amounts of glutamic acid. Preferably, sufficient alkaline hydrolyzate is added to the acid hydrolyzate to give a pH of about 1.6. The subsequent removal of insoluble material and inorganic salts, pH adjustment to about 3.2 and recovery of glutamic acid are substantially the same as described where acid hydrolysis is employed. The purity of the glutamic acid product is between about 90% and about 95%.

The following examples represent specific embodiments of this invention. All parts and percentages are by weight unless otherwise indicated.

Example I

About 1000 parts of concentrated Steffen's filtrate was adjusted to pH 0.5 by the addition of about 376 parts of 37% hydrochloric acid. The adjusted Steffen's filtrate was concentrated in vacuo down to about 770 parts. The concentrate had a specific gravity of 1.43 and contained about 93% solids. The concentrate was allowed to stand over night with gentle stirring whereupon betaine hydrochloride and inorganic salts crystallized from the solution. During the crystallization procedure, the solution was allowed to cool to room temperature. After about 16 hours crystallization, the liquor containing the betaine hydrochloride crystals and inorganic salts was centrifuged for 10 minutes at 1600 R. P. M. The centrifugation resulted in the inorganic salts settling to the bottom of the centrifuge tube and the betaine hydrochloride rising to the top of the tube to form a cake on the surface of the liquor. The betaine hydrochloride cake was scraped from the surface of the liquor and washed with 20 parts of 10% hydrochloric acid, followed by 20 parts of acetone. The betaine hydrochloride thus produced amounted to 21.0 parts and had a purity of 98.5%. The recovery of betaine hydrochloride from the original concentrated Steffen's filtrate amounted to a yield of about 40%.

The liquid phase was decanted from the inorganic materials remaining in the centrifuge tube and the inorganics were washed with 30 parts of water, followed by three 60 part portions of methanol. The inorganics amounted to 87 parts, comprising about 31.1% potassium, 10.5% sodium, and 48.8% chloride ion. Approximately 70% of the potassium values present in the concentrated Steffen's filtrate was recovered.

To the resultant filtrate is added between about 175 parts and about 250 parts by weight of hydrochloric acid (about 37% HCl) and the solution is heated at a temperature between about 100° C. and about 125° C. in order to hydrolyze the glutamic acid mother substances. The hydrolyzate is cooled to about 30° C. and is neutralized to a pH of about 1.6 with a 50% solution of sodium hydroxide. Usually between about 175 parts and about 225 parts by weight of said sodium hydroxide solution will be sufficient. The adjusted hydrolyzate is filtered in order to remove inorganic salts and insoluble material, and the filtrate is concentrated to approximately 90% of the weight of the original Setffen's filtrate. The concentrated solution is cooled to a temperature between about 40 C. and about 60° C. and inorganic salts are crystallized and separated therefrom. The pH of the resultant filtrate is adjusted to about 3.2 with ammonia and the solution allowed to stand for several days in order to permit crystallization of glutamic acid therefrom. The product is removed by filtration and is preferably repulped with about 60% by weight of water in order to remove residual inorganic salts. The purity of the glutamic acid is between about 90% and about 95%.

*Example II*

About 500 parts of concentrated Steffen's filtrate end liquor remaining after the removal of glutamic acid from concentrated Steffen's filtrate hydrolyzate was adjusted to pH 0.5 by the addition of about 89 parts of 37% hydrochloric acid. The adjusted Steffen's filtrate end liquor was concentrated in vacuo down to about 385 parts. The concentrated liquor has a specific gravity of 1.43 and contained about 93% solids. The concentrate was allowed to stand over night with gentle stirring whereupon betaine hydrochloride and inorganic salts crystallized from the solution. During the crystallization procedure, the solution was allowed to cool to room temperature. After about 16 hours crystallization, the end liquor containing the betaine hydrochloride crystals and inorganic salts was centrifuged for 10 minutes at 1600 R. P. M. The centrifugation resulted in the inorganic salts settling to the bottom of the centrifuge tube and the betaine hydrochloride rising to the top of the tube to form a cake on the surface of the liquor. The betaine hydrochloride cake was scraped from the surface of the liquor and washed with 10 parts of 10% hydrochloric acid, followed by 10 parts of acetone. The betaine hydrochloride thus produced amounted to 30.0 parts and had a purity of 97.4%. The recovery of betaine hydrochloride from the original concentrated Steffen's filtrate amounted to a yield of about 41%.

The liquid phase was decanted from the inorganic materials remaining in the centrifuge tube and the inorganics were washed with 15 parts of water, followed by three 30 part portions of methanol. The inorganics amounted to 46.5 parts, comprising about 6.5% potassium, 32.4% sodium, and 56.0% chloride ion. Approximately 40% of the potassium values present in the concentrated Steffen's filtrate end liquor had been removed.

Having thus fully described and illustrated the character of the instant invention, what is desired to be secured and claimed by Letters Patent is:

1. A process for simultaneously recovering inorganic salts and betaine hydrochloride from a solution containing inorganic salts and betaine which comprises concentrating the solution to a specific gravity between about 1.2 and about 1.5, adding hydrochloric acid to the solution to adjust the pH of the solution to a value less than about 1.0, crystallizing betaine hydrochloride and inorganic salts from the solution, applying centrifugal force to the resulting slurry while retaining the liquid phase, whereby said betaine hydrochloride and said inorganic salts move to and collect at opposite surfaces of the liquid phase, separating the betaine hydrochloride cake from the upper surface of the liquid phase, and filtering the remaining mixture to recover the inorganic salts.

2. A process for recovering betaine hydrochloride from Steffen's filtrate end liquor containing betaine which comprises concentrating said end liquor to a specific gravity between about 1.2 and about 1.5, adjusting the pH of the concentrated end liquor to less than about 1.0, allowing the concentrated adjusted end liquor to stand with gentle agitation to permit betaine hydrochloride and inorganic salts to crystallize, applying centrifugal force to the resulting slurry while retaining the liquid phase, whereby said betaine hydrochloride and said inorganic salts move to and collect at opposite surfaces of the liquid phase, and separating the betaine hydrochloride cake from the upper surface of the liquid phase.

3. A process for recovering betaine hydrochloride from Steffen's filtrate end liquor containing betaine which comprises concentrating said end liquor to a specific gravity between about 1.35 and about 1.50, adjusting the pH of the concentrated end liquor to less than about 1.0, allowing the concentrated adjusted end liquor to stand with gentle agitation to permit betaine hydrochloride and inorganic salts to crystallize, applying centrifugal force to the resulting slurry while retaining the liquid phase, whereby said betaine hydrochloride and said inorganic salts move to and collect at opposite surfaces of the liquid phase, and separating the betaine hydrochloride cake from the upper surface of the liquid phase.

4. A process for recovering betaine hydrochloride from concentrated Steffen's filtrate which comprises adding hydrochloric acid to concentrated Steffen's filtrate to adjust the pH to a value less than about 1.0, concentrating the adjusted Steffen's filtrate to a specific gravity between about 1.2 and about 1.5, allowing the resulting concentrate to stand with gentle agitation to permit betaine hydrochloride and inorganic salts to crystallize, applying centrifugal force to the resulting slurry while retaining the liquid phase, whereby said betaine hydrochloride and said inorganic salts move to and collect at opposite surfaces of the liquid phase, and separating the three layers produced during the centrifuging operation.

5. A process for recovering betaine hydrochloride from concentrated Steffen's filtrate which comprises adding hydrochloric acid to concentrated Steffen's filtrate to adjust the pH to a value less than about 1.0, concentrating the adjusted Steffen's filtrate to a specific gravity of between about 1.35 and about 1.50, allowing the resulting concentrate to stand with gentle agitation to permit betaine hydrochloride and inorganic salts to crystallize, applying centrifugal force to the resulting slurry while retaining the liquid phase, whereby said betaine hydrochloride and said inorganic salts move to and collect at opposite surfaces of the liquid phase, and separating the three layers produced during the centrifuging operation.

References Cited in the file of this patent

UNITED STATES PATENTS

| | | |
|---|---|---|
| 1,634,221 | Tressler | June 28, 1927 |
| 2,519,573 | Hoglan | Aug. 22, 1950 |